(12) United States Patent
Bryskin et al.

(10) Patent No.: US 9,565,128 B2
(45) Date of Patent: Feb. 7, 2017

(54) METHOD FOR MANAGING SERVICES IN A GENERALIZED-MULTI-PROTOCOL LABEL SWITCHING, GMPLS, CONTROLLED NETWORK

(75) Inventors: Igor Bryskin, Martinsreid/Munich (DE); Vishnu Beeram, Martinsreid/Munich (DE)

(73) Assignee: ADVA Optical Networking SE, Meiningen OT Dreissigacker (DE)

( * ) Notice: Subject to any disclaimer, the term of this patent is extended or adjusted under 35 U.S.C. 154(b) by 155 days.

(21) Appl. No.: 13/599,200

(22) Filed: Aug. 30, 2012

(65) Prior Publication Data

US 2014/0064057 A1 Mar. 6, 2014

(51) Int. Cl.
| | |
|---|---|
| *H04L 12/913* | (2013.01) |
| *H04L 12/911* | (2013.01) |
| *H04L 12/781* | (2013.01) |
| *H04L 12/707* | (2013.01) |
| *H04L 12/703* | (2013.01) |

(52) U.S. Cl.
CPC ............. *H04L 47/724* (2013.01); *H04L 47/74* (2013.01); *H04L 45/22* (2013.01); *H04L 45/28* (2013.01); *H04L 45/52* (2013.01)

(58) Field of Classification Search
CPC .......... H04L 45/50; H04L 65/80; H04L 45/28; H04L 67/18; H04L 12/4633; H04L 12/66; H04L 29/06027; H04L 45/22; H04L 65/1069; H04W 4/02; H04W 4/023; H04W 4/04
USPC ............... 370/235, 392, 252, 352, 401, 230, 254,370/228, 242, 389, 217, 218, 225, 238
See application file for complete search history.

(56) References Cited

U.S. PATENT DOCUMENTS

| | | | |
|---|---|---|---|
| 2009/0310482 A1* | 12/2009 | Asaie ................. | G06F 11/1443 370/225 |
| 2009/0323698 A1* | 12/2009 | Le Faucheur et al. | .. 370/395.53 |
| 2013/0301402 A1* | 11/2013 | Ceccarelli et al. | ........... 370/216 |

FOREIGN PATENT DOCUMENTS

WO 2011137936 A1 11/2011

OTHER PUBLICATIONS

Awduche et al. "RSVP-TE Extensions to RSVP for LSP Tunnels", Dec. 2001.*

(Continued)

*Primary Examiner* — Un C Cho
*Assistant Examiner* — Oussama Roudani
(74) *Attorney, Agent, or Firm* — Michael G. Johnston; Moore & Van Allen PLLC

(57) ABSTRACT

A Generalized-Multi-Protocol Label Switching controlled network is described, as is a method for managing services in the network under conditions of disrupted control plane connectivity. Nodes of the network use a Resource Reservation Protocol with Traffic Engineering extension, RSVP-TE, to allocate and provision resources of the network. Each of the nodes is adapted to evaluate local RSVP Path or Resv state data after having sent at least one signaling message to a receiving neighboring node without receipt of an acknowledgement message from said receiving node within a configurable time to determine an IP address of a node being located after the non-responsive receiving node along a service path of a service in a downstream or upstream direction. Each node is adapted to send the signaling message to the determined IP address of the next node located behind the non-responsive receiving node along the service path.

12 Claims, 9 Drawing Sheets

(56) References Cited

OTHER PUBLICATIONS

Berger, "Generalized Multi-Protocol Label Switching (GMPLS) Signaling Resource ReserVation Protocol-Traffic Engineering (RSVP-TE) Extensions", Jan. 2003.*
ADVA AG Optical Networking, European Application No. 13174419.5-1857, Extended European Search Report, Dec. 17, 2013.
Berger, L., et al., RSVP Refresh Overhead Reduction Extensions, Apr. 2001.
Resource Reservation Protocol, Dec. 17, 2009, pp. 1-14, http://docwiki.cisco.com/wiki/Resource_Reservation_Protocol.
Wikipedia, Resource Reservation Protocol, Mar. 10, 2012, pp. 1-5, http://en.wikipedia.org/wiki/Resource_reservation_protocol.
Wikipedia, RSVP-TE, Sep. 24, 2011, pp. 1-2, http://en.wikipedia.org/wiki/RSVP-TE.
Wikipedia, Wavelength switched optical network, Jul. 16, 2012, http://en.wikipedia.org/wiki/Wavelength_Switched_Optical_Network_(WSON).

* cited by examiner

METHOD FOR MANAGING SERVICES IN A GENERALIZED-MULTI-PROTOCOL LABEL SWITCHING, GMPLS, CONTROLLED NETWORK

TECHNICAL BACKGROUND

The invention relates to a Generalized-Multi-Protocol Label Switching, GMPLS, controlled network and in particular to enhancements to the GMPLS RSVP-TE protocol for managing transport services under conditions of disrupted control plane connectivity.

The Generalized-Multi-Protocol Label Switching, GMPLS, is a protocol suite extending MPLS to manage further classes of interfaces for switching technologies other than packet interfaces and switching such as time division multiplex, layer 2 switch, wavelength switch and fiber switch. The Generalized MPLS differs from the traditional MPLS in that it supports multiple types of switching. Generalized-Multi-Protocol Label Switching, GMPLS, can, for example, form a control plane of a wavelength switched optical network. Currently, the GMPLS RSVP-TE protocol is widely deployed in GMPLS control transport networks. The GMPLS is composed of three main protocols comprising the Resource Reservation Protocol with Traffic Engineering extensions RSVP-TE signalling protocol, an Open Shortest Path First with Traffic Engineering extensions OSPF-TE routing protocol and the Link Management Protocol LMP. The Resource Reservation Protocol-Traffic Engineering RSVP-TE protocol is an extension of the Resource Reservation Protocol RSVP for Traffic Engineering. It supports the reservation of resource across an IP network. The RSVP-TE protocol is detailed in IETF RFC3209 updated by RFC5151 and generally allows the establishment of MPLS Label Switching Paths (LSPs) taking into consideration network constraint parameters such as available bandwidth and explicit path specification. The GMPLS RSVP-TE protocol (RFC3473) is deployed in GMPLS controlled transport networks. The RSVP-TE protocol works well on IP/MPLS networks. However, on transport networks, the RSVP-TE protocol poses some operational disadvantages when used for dynamic service provisioning in the network.

The GMPLS RSVP-TE protocol is a soft state hop-by-hop protocol. When a service controlled by the GMPLS RSVP-TE protocol needs to be manipulated, for example, set up or torn down, a signalling message is initiated on the service ingress node of the service and forwarded hop-by-hop via transit nodes from the service path to the egress node of the respective service. At the service egress node the message flow is reversed and the message is forwarded back also hop-by-hop via the transit nodes to the ingress node as illustrated in FIG. 1. As can be seen in FIG. 1 the signalling message such as the shown Path message is sent from the ingress node of the service to the egress node and then Resv message is sent back from the egress node to the ingress node of the service. The Path message traverses from the ingress node to the egress node whereas the Resv messages traverse from the egress node to the ingress node. The signalling message (Path or Resv) is processed on a node before it is forwarded by the node along the service path to the next neighbouring node. When the signalling message flow completes the loop back to the ingress node and has been processed by the ingress node, the operation is completed and the management plane of the network is notified about the completion status of the service comprising a success status or a failure status.

At times, when the service does not experience any changes or modifications, all nodes involved in the respective service send and receive periodic Path and Resv refreshes as illustrated by FIG. 2. These periodic refreshes comprise a Path message with unmodified content to the downstream neighbouring node towards the egress node or a Resv message which with unmodified content to the upstream neighbouring node towards the ingress node along the service path. These refreshes according to the protocol mean to say that as far as the node having sent the message is concerned, the service is alive, unmodified and functioning.

FIG. 2 illustrates the GMPLS RSVP-TE refreshing process between an upstream node and a downstream node along the signal path of the service. The downstream refresh messages sent by the upstream node to the downstream node refresh the Path state whereas the upstream refresh messages sent by the downstream node to the upstream node refresh the Resv state of the service. The refresh messages are sent regularly, for instance, every 30 seconds.

FIG. 3 illustrates a situation where a disrupted control plane connectivity in a network using a conventional GMPLS RSVP-TE protocol has occurred. In the shown example of FIG. 3 a service controlled by the GMPLS RSVP-TE protocol starts at node A, ends at node E and takes a service path via transit nodes B, C and D. Accordingly, node A forms the ingress node and node E forms the egress node of the respective service. Nodes B, C, D are transit nodes along the signal path of the service. In a situation where the service has been established and a transit node such as node C has stopped functioning, RSVP-TE protocol speaking nodes B and D do quickly detect this fact because they stop receiving signalling refreshes Resv and Path respectively from the failing node C. Node C may fail in the shown example because of a software bug, a hardware failure, a configuration error or a maintenance procedure at node C. Since nodes B, D do not receive refreshes from node C both transit nodes B and D realize that neighbouring node C is inaccessible. The missing refreshes from node C indicate a disruption in the control plane connectivity, in particular the RSVP-TE connectivity. In conventional IP/MPLS networks missing refreshes also automatically mean the disruption in the data plane, i.e. that the respective service has stopped transferring user data. This is because IP/MPLS routers send each other RSVP-TE message "in band", this means that they use the same network resources to transfer control plane messages and user data thus having a 100% fate sharing. Therefore, a situation such as shown in FIG. 3 does not present a problem on a conventional IP/MPLS network. In such an IP/MPLS network the neighbouring nodes B and D at the failed node C simply initiate a disfunctional service release in both directions. Node D does tear down the tail of the service by issuing a PathTear message in downstream direction towards the egress node E, while node B does tear down the service head by triggering a PathErr flow in the upstream direction towards the ingress node A. As soon as the PathErr message is processed on the service ingress node A, the management plane and the operator are notified about the service release and the reason as to why this service release was necessary. In contrast, on a transport layer network, such as a WDM network, the situation such as shown in FIG. 3 is problematic. The neighbouring nodes B and D do detect missing refreshes from the failed node C and the control plane connectivity disruption. This detected fact does not mean that the service has stopped delivering user traffic. This is because transport network elements deliver RSVP-TE packets "out of band"

via a separate Data Communication Network DCN. In fact, probabilistically there is a good chance that the service is still healthy and transferring the user data normally. Therefore, unlike in the case of a conventional IP/MPLS network, the neighbouring nodes B and D of the failed node C in this case are not allowed to tear down the service. Indeed, nodes of conventional GMPLS RSVP-TE implementations do nothing in such a situation except for logging the fact that they have stopped receiving the signalling refreshes from their neighbouring node such as node C as shown in FIG. 3. Furthermore, the conventional GMPLS RSVP-TE protocol provides currently no way for the neighbouring nodes B or D to notify the service ingress node A about the detected disruption in the control plane connectivity with a consequence that this fact will go unnoticed by the operator of the network.

If in such a situation the operator wants, for example/to tear down the service as illustrated in FIG. 4 this would be problematic. A tear down of the service is done by triggering a PathTear message from the service ingress node A. The PathTear message would be propagated only as far as node B, where, after several attempts to send it to the non-responsive node C, node B would give up and stop, leaving the respective service in a state where the head segment, i.e. nodes A and B, is released while the tail segment, i.e. nodes C-D-E, is strayed. Again, the conventional GMPLS RSVP-TE protocol used in transport networks currently provides no way to notify the service ingress node A about the fact that the service release has not been fully completed, hence this fact will also go unnoticed. If in such a situation the operator of the network tries to set up a new service starting possibly from a different ingress node that relies on some of the strayed resources, i.e. tail segment D-E, this attempt will fail. Even after the non-responsive node C comes up back into service, no automatic release of the strayed resources is performed. Because the service head segment, i.e. nodes A, B has been removed, node C does not receive any Path refreshes for the service from node B. However, node C does not have any information as to why these refreshes are missing. It may be that the service is active but node B is currently down or the Path message is lost because of some DCN problems. Therefore, no automatic release of the service will be attempted.

As shown in FIG. 4 if the control plane connectivity between node B and C and between node C and D is disrupted, modify messages and teardown messages cannot traverse beyond node B as explained above. Accordingly, networks using a conventional GMPLS RSVP-TE protocol can face serious operational problems under conditions of disrupted control plane connectivity. These operational problems are complex and difficult to understand for the operator of the network. Moreover, these operational problems caused by disrupted control plane connectivity are not easy to fix because they require some lengthy in-depth investigation by a highly qualified personnel and a manual cleanup that is also prone to configuration errors.

Accordingly, it is an object of the present invention to provide a method for a network which overcomes the above-mentioned problems caused by a disrupted control plane connectivity.

SUMMARY OF THE INVENTION

The invention provides a method for managing services in a Generalized-Multi-Protocol Label Switching, GMPLS, controlled network under conditions of a disrupted control plane connectivity,
wherein nodes of said network use a Resource Reservation Protocol with Traffic Engineering extensions, RSVP-TE, to allocate and provision resources of said network,
said method comprising the steps of:
evaluating local RSVP Path and/or Resv state data by a sending node having sent at least once a signalling message to a receiving node without receipt of an acknowledgement message from said receiving node within a configurable time to determine an IP address of a node being located after the non-responsive receiving node along a service path and sending the signalling message by the sending node to the determined IP address of the next node located behind the non-responsive receiving node along the service path.

In a possible embodiment of the method according to the present invention if the sending node does not receive an acknowledgement message from the node located behind the non-responsive receiving node along the service path the sending node repeats the evaluating step and the sending step until it receives an acknowledgement message from one of the addressed nodes along the service path or until the addressed node is the service egress or ingress node of the respective service and is not responsive.

In a possible embodiment of the method according to the present invention if a node of said network detects that it did not receive a refresh message from a neighbouring node along the signal path, the node sends at least one RSVP-TE protocol state verification message comprising a Path state verification message directed to the upstream neighbouring node or a Resv state verification message directed to the downstream neighbouring node.

In a further possible embodiment of the method according to the present invention the neighbouring node after receipt of a RSVP-TE protocol state verification message looks up a RSVP-TE protocol state of the service specified in the received RSVP-TE protocol state verification message in a local Path/Resv state database.

In a possible embodiment of the method according to the present invention the neighbouring node responds to the received RSVP-TE protocol state verification message with a Path/Resv refresh message if the requested RSVP-TE protocol state is found in the Path/Resv state database of said neighbouring node.

In a further possible embodiment of the method according to the present invention the neighbouring node responds to the received RSVP-TE protocol state verification message with a RSVP-TE protocol state removal message PathTear/ResvTear, if the requested RSVP-TE protocol state is not found in the Path/Resv state database of the neighbouring node.

In a further possible embodiment of the method according to the present invention a node after having sent a configurable number of RSVP-TE Path/Resv state verification messages to a neighbouring node along the signal path does not receive a Path/Resv refresh message from the neighbouring node, the node sends a Control Plane Connectivity Disruption (CPCD) alarm message to the service ingress node of the respective service.

In a further possible embodiment of the method according to the present invention wherein the ingress node of the service path after having received the CPCD alarm message is adapted to notify a management plane and a service operator of the respective service that the service has become at least partially unmanageable due to a detected control plane connectivity disruption in the service path and/or to trigger service restoration procedures.

In a further possible embodiment of the method according to the present invention wherein if the PathModify/PathTear/

PathErr/ResvModify/ResvErr message reaches the neighbouring node of the non-responsive receiving node having caused the control plane connectivity disruption of the respective service, the neighbouring node sends the received message directly to the IP address of the next node located after the non-responsive receiving node,
wherein this node forwards the message along the signal path of the service until it reaches the egress/ingress node of the respective service to release network resources associated with the respective service.

In a further possible embodiment of the method according to the present invention wherein if a temporarily failed non-responsive node having caused a control plane connectivity disruption of the service comes back into service and detects that it does not receive a Path/Resv refresh message from at least one of its neighbouring nodes it sends at least one Path or Resv state verification message to the neighbouring node to check the existence of Path/Resv state associated with the respective service to which the neighbouring node responds with a PathTear/ResvTear message to release network resources associated with the respective service controlled by the temporarily failed non-responsive node in case the requested Path/Resv state of the respective service is not found or with Path/Resv refresh message in case the said state is found In a further possible embodiment of the method according to the present invention the signalling message is sent by said sending node to the IP address of the next node located behind the non-responsive receiving node in an IP data packet along a route indicated in an IP routing table of the sending node.

In a further possible embodiment of the method according to the present invention wherein for performing a manipulation operation on a service a corresponding signalling message formed by a Path message is sent hop by hop from the ingress node of the service via transit nodes along the signal path of the service to the egress node of the service and from the egress node as a Resv message back hop by hop via the transit nodes along the signal path of the service to the ingress node of the service to indicate a completion status of the respective manipulation operation,
wherein the signalling message is processed by each node along the signal path before being forwarded to the next neighbouring node along the signal path of the service.

In a further possible embodiment of the method according to the present invention the signalling messages are formed by RSVP-TE messages transported in a data communication network forming the control plane.

The invention further provides a Generalized-Multi-Protocol Label Switching, GMPLS, controlled network comprising the nodes using a Resource Reservation Protocol with Traffic Engineering extension, RSVP-TE, to allocate resources of the network,
wherein each node is adapted to evaluate local RSVP Path and/or Resv state data after having sent at least once a signalling message to a receiving neighbouring node without receipt of an acknowledgement message from said receiving neighbouring node within a configurable time to determine an IP address of a node being located after the non-responsive receiving node along a service path of a service; and
wherein each node is adapted to send the signalling message to the determined IP address of the next node located behind the non-responsive receiving node along the service path of the service.

BRIEF DESCRIPTION OF THE FIGURES

In the following possible embodiments of the method and network according to the present invention are described with reference to the enclosed figures in more detail.

DETAILED DESCRIPTION OF THE EMBODIMENTS

Figure 1:
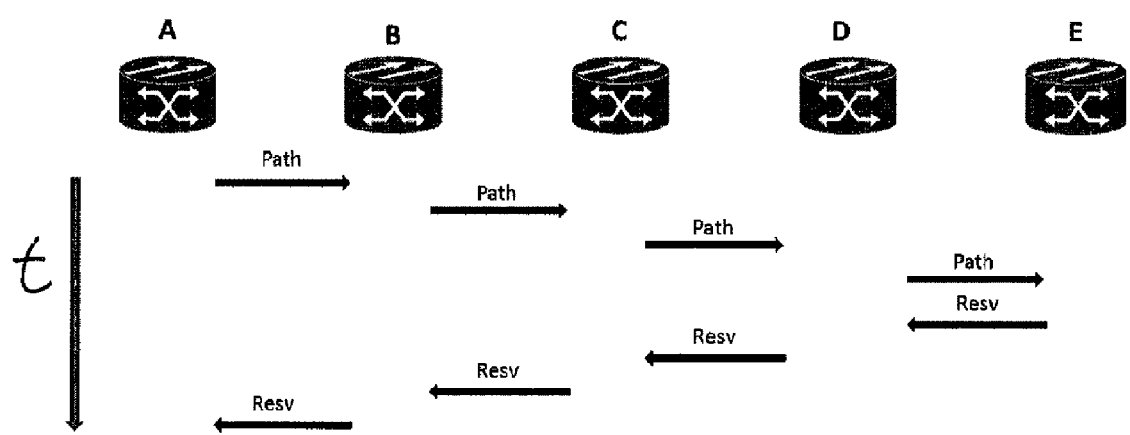
FIG. 1 shows a diagram for illustrating a modification of a signalling state in a conventional GMPLS RSVP-TE controlled network.
Figure 2:
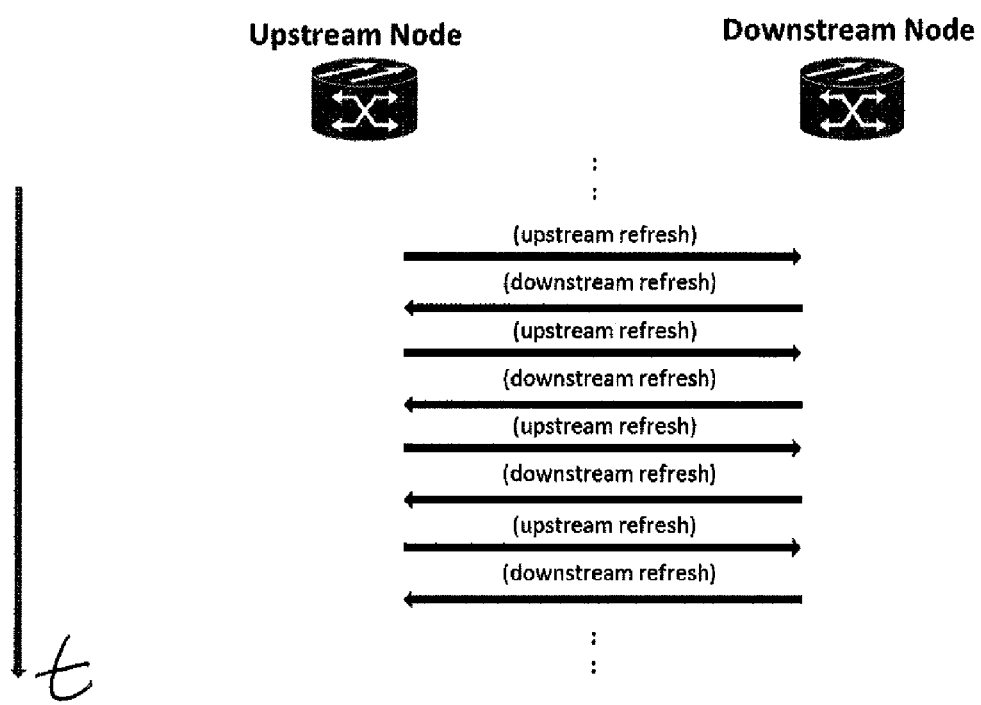
FIG. 2 shows the refreshing of a signalling state in a conventional GMPLS RSVP-TE controlled network.
Figure 3:
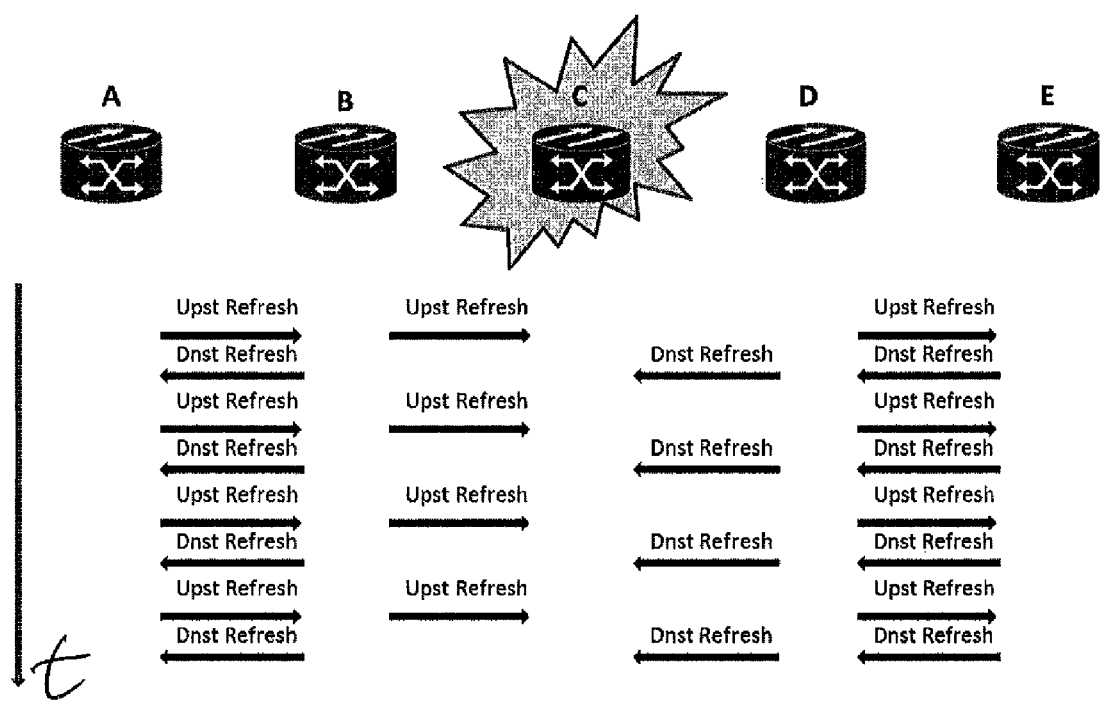
FIG. 3 shows a disrupted control plane connectivity in a conventional GMPLS RSVP-TE controlled network to illustrate a problem underlying the present invention.
Figure 4:
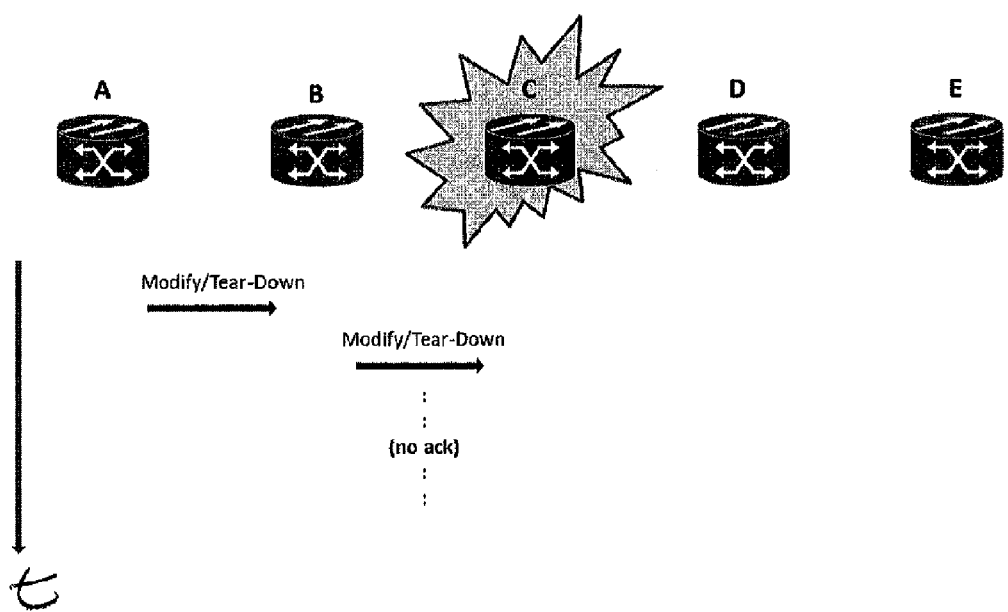
FIG. 4 shows a further diagram for illustrating a modification or a teardown of a state when a control plane connectivity in a conventional GMPLS RSVP-TE controlled network is disrupted to illustrate a problem underlying the present invention.
Figure 5:
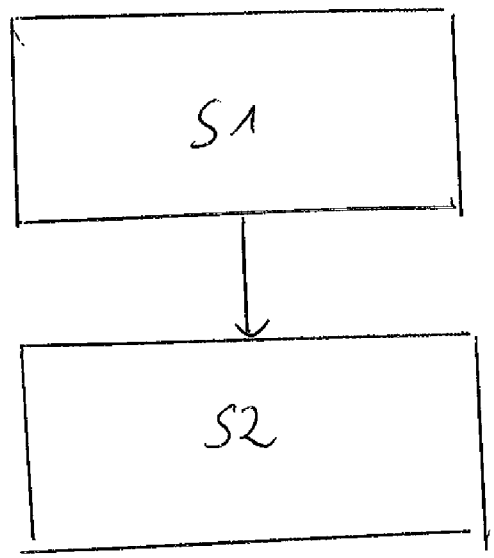
FIG. 5 shows a flow diagram for illustrating a possible embodiment of a method for managing a service in a Generalized-Multi-Protocol Label Switching, GMPLS, controlled network under conditions of a disrupted control plane connectivity according to the present invention.

FIG. 5 shows a follow chart of a possible embodiment of a method for managing services in a Generalized-Multi-Protocol Label Switching, GMPLS, controlled network under conditions of a disrupted control plane connectivity. The nodes of said network use a Resource Reservation Protocol with Traffic Engineering extensions, RSVP-TE, to allocate and provision resources of said network. The RSVP-TE protocol is specified in RFC 3209. As can be seen in the flow chart of FIG. 5 the method comprises two steps.

In a first step S1 a local RSVP Path or Resv state data is evaluated by a sending node having sent at least once a signalling message to a receiving node without receipt of an acknowledgement message from said receiving node within a configurable time to determine an IP address of a node being located after the non-responsive receiving node along a service path of the respective service.

In a second step S2 the sending node sends the signalling message to the determined IP address of the next node located behind the non-responsive receiving node along the service path. The signalling message is sent by the sending node to the IP address of the next node located behind the non-responsive receiving node in an IP data packet along a route indicated in an IP routing table of the sending node.

Figure 6:
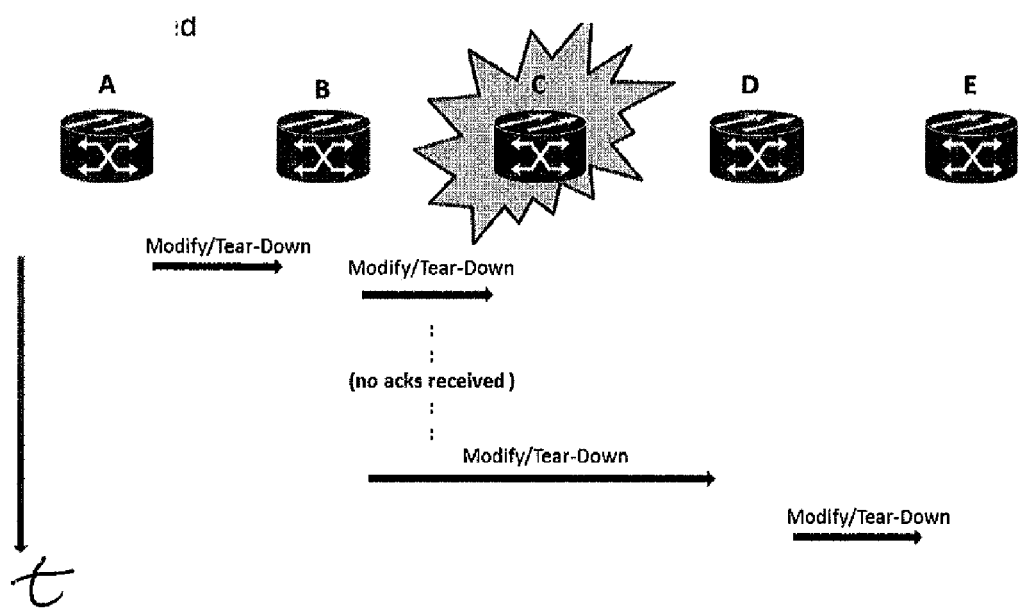
FIG. 6 shows a diagram for illustrating a possible embodiment of the method according to the present invention.

RSVP-TE messages with the exception of Notify message are propagated hop-by-hop along the service path. When a RSVP-TE protocol speaking node receives a message it is supposed to send a short acknowledgement message MsgAck, to the sending node. In a conventional network if the sending node does not receive the acknowledgement message within a configurable time, it repeats the attempt a configurable number of times so that the attempts are separated from each other by a configurable time interval. If all attempts prove to be unsuccessful, the sending node logs a failure and gives up in the conventional MPLS controlled network. In contrast, with the method according to the present invention if all attempts to receive an acknowledgement message fail the sending RSVP-TE speaking node performs a RSVP-TE message tunneling around the non-responsive node as illustrated in FIG. 6. In the exemplary situation of FIG. 6 after node C has gone for whatever reason out of service, there is a disrupted control plane connectivity in the signal path of the respective service. As can be seen in FIG. 6 there is a control plane connectivity disruption between node B and node C as well as between node C and node D. In the method according to the present invention the sending node uses the Path or Resv Record Route information available via local Path/Resv states associated with the service to determine an IP address of the RSVP-TE protocol speaking node located immediately after the non-responsive node C along the service path in the proper direction. The sending node such as node B having sent one or several signalling messages comprising for instance a PathModify message or a PathTear message to the receiving node C without receipt of an acknowledgement message from the receiving node C within a configurable time does evaluate the local RSVP Resvstate (node B evaluates Resv state, node D evaluates Path state) data to determine an IP address of a node D being located after the non-responsive receiving node C along the service path. The sending node B does send the signalling message to the determined IP address of the next node located behind the non-responsive receiving node C along the service path. Node B sends the message directly to the IP address determined in the first step S1 using full DCN flexibility. As shown in FIG. 6 PathModify messages and PathTear messages are tunneled by the sending node B through the non-responsive node C to the next node D located immediately after the non-responsive receiving node C along the service path. If the sending node B does not receive an acknowledgement message from the next node D located behind the non-responsive receiving node C along the service path, the sending node B repeats the evaluating step and the sending step, until it receives an acknowledgement message from one of the addressed nodes along the service path or until the addressed node is a service egress node E of the respective service and this egress node E is non-responsive. Accordingly, the method according to the present invention does allow the propagation of all RSVP-TE messages with the exception of the very first Path message along the service path even under conditions when one or several RSVP-TE protocol speaking nodes are out of service.

Figures 7A, 7B:
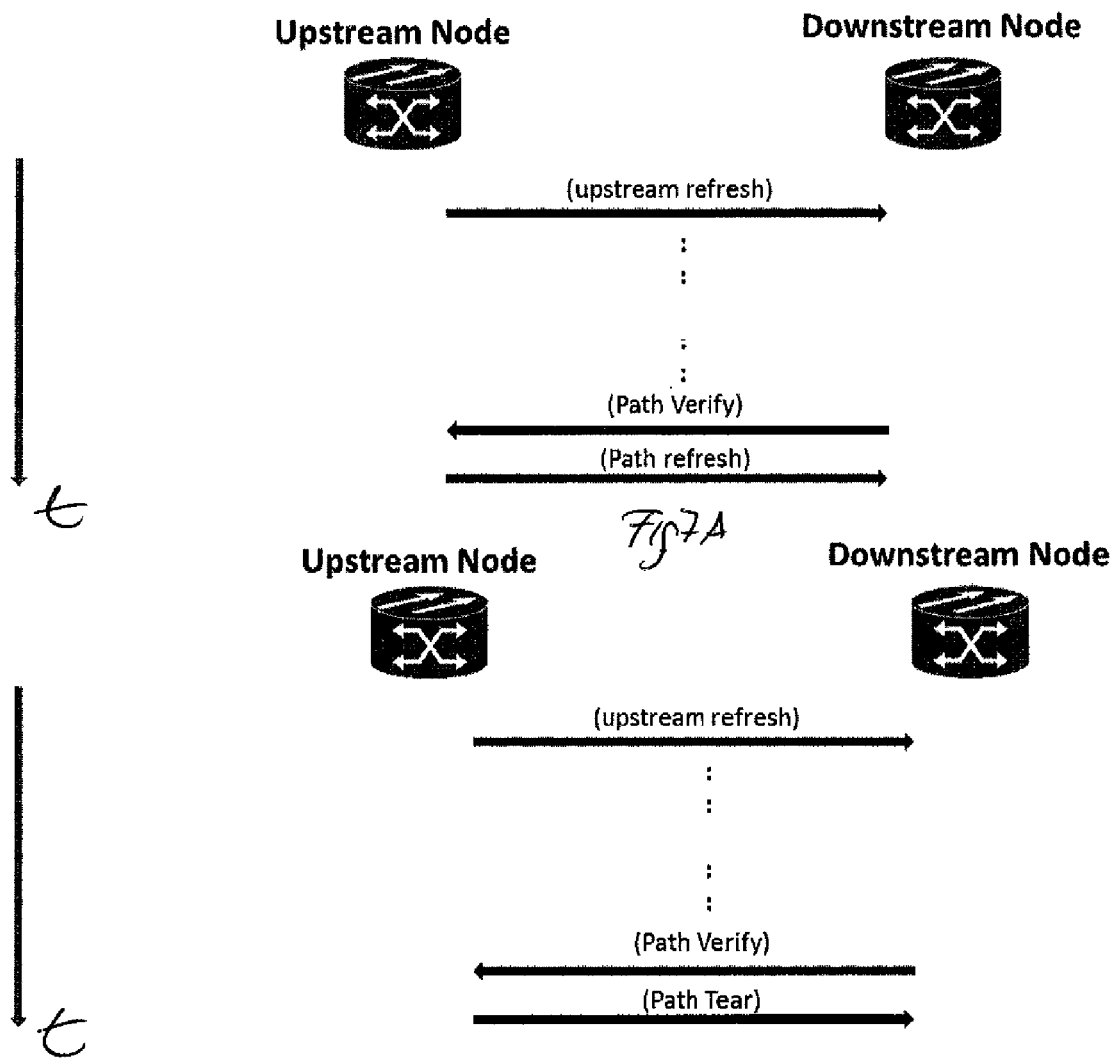
FIG. 7a, 7b show diagrams for illustrating possible embodiments of the method according to the present invention.
Figure 8A:
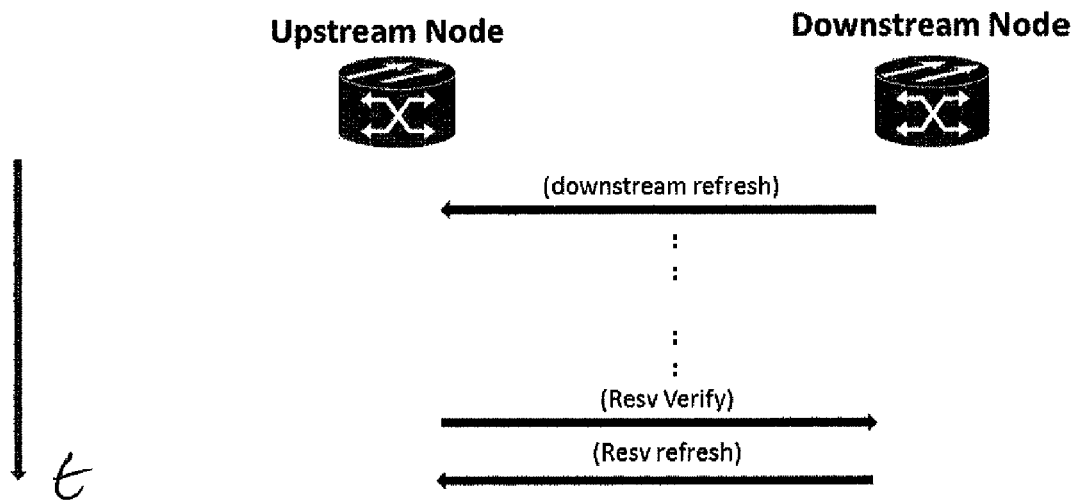
FIG. 8a, 8b show diagrams for illustrating possible embodiments of the method according to the present invention.

In a possible embodiment of the method according to the present invention if the node of the network detects that it did not receive a Path/Resv Refresh message from a neighbouring node along the signal path, the node can send at least one RSVP-TE protocol Path/Resv Verify message comprising a Path state verification message directed to the upstream neighbouring node or a Resv state verification message directed to the downstream neighbouring node. In a possible embodiment the method introduces additional RSVP-TE protocol messages using an additional signalling message for downstream direction—ResvVerify—and an additional signalling message for upstream direction—PathVerify. The purpose of these additional signalling messages is to request an explicit RSVP-TE Path/Resv state verification. For each node two different states are kept comprising a Path state created by a Path message and a Resv state created by a Resv message. Consequently, to verify the state at the upstream neighbouring node, the message PathVerify is sent and can be answered either by a Path Refresh message or a PathTear message. To verify the state at a downstream neighbouring node the message ResvVerify is sent and can be answered either by a ResvRefresh message or a ResvTear message. The neighbouring node after receipt of a RSVP-TE protocol state verification message looks up a RSVP-TE protocol state of the service specified in the received RSVP-TE protocol state verification message in a local Path/Resv state database. If the received RSVP-TE protocol state can be found in the Path/Resv state database of the neighbouring node, the neighbouring node responds to the received RSVP-TE protocol state verification message with a Path/Resv Refresh message. In contrast, if the requested RSVP-TE protocol state cannot be found in the Path/Resv state database of the neighbouring node the neighbouring node responds to the received RSVP-TE protocol state verification message with a RSVP-TE Path/Resv Tear message. As illustrated in context with FIG. 7A, 7B the RSVP-TE protocol speaking node may issue a RSVP-TE state verification message to its immediate neighbouring node if it detects that a configurable number of subsequent signalling refreshes from the neighbouring node is missing. As can be seen in FIG. 7A if the downstream node does not receive Path Refresh messages from its neighbouring upstream node in the signal path a Path Verify message is sent to the upstream node after a configurable number of subsequent Path Refresh messages from the neighbouring upstream node has not been received by the downstream node. Likewise, a ResvVerify message can be sent to the downstream neighbouring node after a configurable number of subsequent Resv refreshes has not been received as illustrated in FIG. 8A. Except for the message types the formats of Path verification message (Path Verity) and reverse verification message (Resv Verity) can respectively be identical to the formats of the PathTear and ResvTear messages.

Figure 8B:
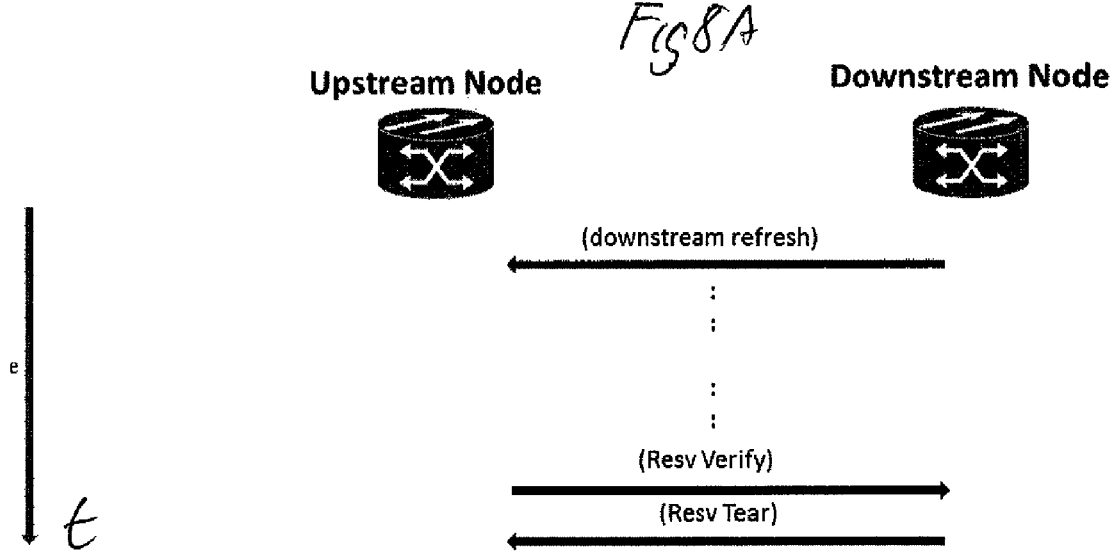

The receiving node of a Path Verify message or a ResvVerify message treats the message as a request to explicitly confirm or deny the existence of the state and, therefore, the service associated with the state. Specifically, on receipt of a PathVerify message, the RSVP-TE protocol speaking node looks up a Path state of the specified service in its local Path State Database, and, if the state can be found, responds to the message with a Path Refresh message as shown in FIG. 7A, otherwise with a PathTear message as shown in FIG. 7B. Likewise, on receipt of a ResvVerify message, the RSVP-TE protocol speaking node looks up the Resv state of the specified service in its local Resv State Database, and, if the state can be found, responds to the message with a Resv Refresh as shown in FIG. 8A, otherwise with a ResvTear message as shown in FIG. 8B.

By providing a state verification message according to the shown embodiment of the present invention it is possible to translate an ambiguous event of missing refreshes into an explicit instruction to delete the service in case that the service is not needed any longer.

Figure 9:
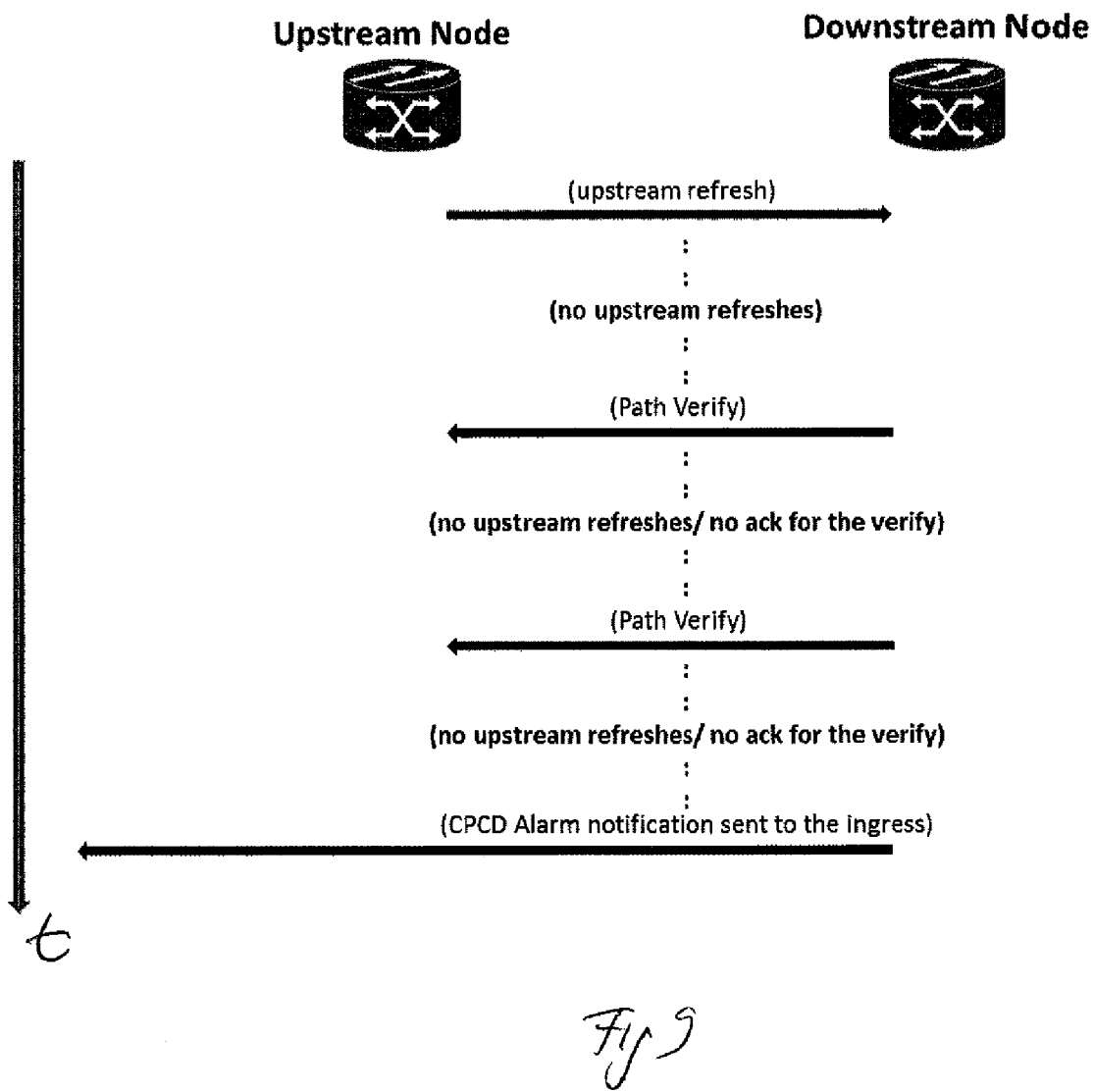
FIG. 9 shows a diagram for illustrating a further possible embodiment of the method according to the present invention.

In a possible embodiment of the method according to the present invention if a node having sent a configurable number of RSVP-TE protocol state verification messages to the neighbouring node along the signal path does not receive a Refresh or Tear message from the neighbouring node, the node can send a control plane connectivity disruption, CPCD, alarm message to the service ingress node of the respective service, as illustrated in FIG. 9.

In a conventional WDM layer GMPLS RSVP-TE controlled network there is a way of notifying a service ingress node about a service data plane failure such as "Loss of light" or "Loss of signal". Such a data plane failure can for instance happen because of a fiber cut. A piece of information called data plane alarm containing the location of the failure, i.e. node ID, interface ID, and resource ID, and the details such as failure type, severity, scope, etc. is encoded in such a RSVP Notify message, which can be sent from the failure detecting node to the service ingress node not hop-by-hop as all other RSVP signalling messages, but directly, using full DCN flexibility. On receipt of the carrying data plane alarm RSVP Notify message, the ingress node of the service normally notifies the management plane and hence the operator of the service about the fact that the service is not functioning normally due to the indicated failure. Depending on the policies configured for the respective service, the ingress node of the service may additionally trigger service restoration procedures.

In the embodiment as illustrated in FIG. 9 the method can provide a notion of control plane connectivity disruption alarm. Apart from the alarm type, the control plane connectivity disruption, CPCD, alarm message can have the same content, encoding and way of communicating the alarm to the ingress node via a RSVP Notify message as a data plane alarm message. Accordingly, in this implementation the method provides a RSVP-TE protocol speaking node which after issuing a configurable number of subsequent, not responded RSVP state verification messages comprising a PathVerify or a ResvVerify message does send a control plane connectivity disruption CPCD alarm message to the service ingress node as illustrated in FIG. 9. On receipt of the RSVP Notify message carrying the control plane connectivity disruption, CPCD, alarm, the ingress node does in a possible embodiment notify the management plane and optionally the operator of the service and network indicating that the service became partially unmanageable because one of the RSVP-TE controllers, for example node C, has stopped working. In a possible embodiment, if the temporarily failed non-responsive node is node C having triggered a control plane connectivity disruption, CPCD, of the service comes back into service and detects that it does not receive a refresh message from at least one of its neighbouring nodes, it can send at least one Path or Resv state verification message to the at least one neighbouring node to check the existence of states associated with the respective service to which the at least one neighbouring node responds with a PathTear/ResvTear message to release network resources associated with the respective service controlled by the temporarily failed non-responsive node such as node C. When the operator does try to delete the service, the PathTear message will be originated on the ingress node of the service and sent hop-by-hop via transit nodes in the downstream direction along the service path. If, for example, node B of the service path notices that its attempt to send a message to its downstream neighbouring node, i.e. node C, keeps failing, it can determine via the Record Route information that the next node after node C along the service path in the downstream direction is node D and send the PathTear message directly to this node D. Node D can process the message and forward it further downstream. Thus, all network resources associated with the service except for the resources which are directly controlled by node C can be released and made available for other services. Accordingly, when node C comes back up into service, it will notice that it does not receive Path refreshes from neighbouring node B and Resv refreshes from its other neighbouring node D of the respective service, which has been deleted while node C was not operative. In this situation node C does send a PathVerify message to node B and a ResvVerify message to node D to check the existence of states associated with the service in question. In response to this the neighbouring node B and D will send PathTear and ResvTear message, respectively, forcing node C to release all locally controlled resources associated with the respective service. The final result is that all resources allocated to the service in the example given in context with the figures are released without that any manual cleanup becomes necessary despite of one of the RSVP-TE controllers was not functioning at the time when the request to tear down the service has been issued. Accordingly, it is possible that a service can be dynamically modified, replaced and/or deleted even under conditions when one or several RSVP-TE controllers that have been participated in the service setup stop functioning.

The extensions and enhancements provided by the method according to the present invention overcome problems of conventional Generalized-Multi-Protocol Label Switching, GMPLS, controlled network under conditions of a disrupted control plane connectivity. It is possible that nodes of an existing GMPLS controlled network are upgraded with a GMPLS RSVP-TE protocol implementation with the method according to the present invention. In the given example described with reference to the enclosed figures the path A-B-C-D-E of the service was set up and then in the given example a node C along the path stops functioning in the control plane. In the method according to the present invention node B and D do send ResvVerify and PathVerify messages respectively to the failing node C, after nodes B and D discover that the Resv/Path refreshes from node C are missing. Because the failing node C does not respond to the state verification messages, the neighbouring nodes B and D do send a control plane connectivity disruption, CPCD, alarm to the service ingress node A. This way the operator of the network does learn that the service became partially unmanageable because one of the RSVP-TE controllers, i.e. the controller of node C, has stopped working.

The invention claimed is:

1. A method for managing services in a Generalized-Multi-Protocol Label Switching, GMPLS, controlled network under conditions of a disrupted control plane connectivity, wherein nodes of said network use a Resource Reservation Protocol with Traffic Engineering extensions, RSVP-TE, to allocate and provision resources of said network, said method comprising the steps of:

(a) evaluating local RSVP Path or Resv state data by any of said network nodes acting as a sending node, the sending node having sent at least once a signalling message to a receiving node without receipt of an acknowledgement message from said receiving node within a configurable time to determine an IP address of a node being located after the non-responsive receiving node along a service path; and (b) sending the signalling message by the sending node to the determined IP address of the next node located behind the non-responsive receiving node along a service path, wherein if a node of said network detects that it did not receive a Path/Resv Refresh message from a neighbouring node along the signal path, the node sends at least one RSVP-TE protocol state verification message comprising a Path state verification (PathVerify) message directed to the upstream neighbouring node or a Resv state verification (ResvVerify) message directed to the downstream neighbouring node, wherein the node after having sent a configurable number of RSVP-TE protocol state verification messages to the neighbouring node along the signal path receives neither a Path/Resv Refresh nor Tear message from the neighbouring node, the node sends a control plane connectivity disruption, CPCD, alarm message to the service ingress node of the respective service, wherein the ingress node of the service after having received the control plane connectivity disruption, CPCD, alarm message is adapted to notify a management plane and/or a service operator of the respective service that the service has become at least partially unmanageable due to a detected control plane connectivity disruption, CPCD, in the signal path and/or to trigger service restoration procedures, wherein if PathModify, PathTear or ResvErr message reaches the neighbouring node of the non-responsive receiving node having caused the control plane connectivity disruption, CPCD, of the respective service, the neighbouring node sends the message directly to the IP address of the next node located after the non-responsive receiving node in the downstream direction, and wherein the next node located after the non-responsive receiving node in the downstream direction forwards the message along the signal path of the service until it reaches the egress node of the respective service to possibly release or reprovision network resources associated with the respective service.

2. The method according to claim 1, wherein if the sending node does not receive an acknowledgement message from the node located behind the non-responsive receiving node along the service path the sending node repeats the evaluating step and the sending step until it receives an acknowledgement message from one of the addressed nodes along the service path or until the addressed node is the service egress or ingress node of the respective service and is not responsive.

3. The method according to claim 1, wherein if a node of said network detects that it did not receive a Path/Resv Refresh message from a neighbouring node along the signal path, the node sends at least one RSVP-TE protocol state verification message comprising a Path state verification (PathVerify) message directed to the upstream neighbouring node or a Resv state verification (ResvVerify) message directed to the downstream neighbouring node.

4. The method according to claim 3, wherein the neighbouring node after receipt of a RSVP-TE protocol state verification message looks up a RSVP-TE protocol state of the service specified in the received RSVP-TE protocol state verification message in a local Path/Resv state database.

5. The method according to claim 4, wherein the neighbouring node responds to the received RSVP-TE protocol state verification message with a Path/Resv Refresh message if the requested RSVP-TE protocol state is found in the Path/Resv state database of said neighbouring node.

6. The method according to claim 5, wherein the neighbouring node responds to the received RSVP-TE protocol state verification message with a Path/Resv Tear message, if the requested RSVP-TE protocol state is not found in the Path/Resv state database of the neighbouring node.

7. The method according to claim 3, wherein a node after having sent a configurable number of RSVP-TE protocol state verification messages to a neighbouring node along the signal path receives neither a Path/Resv Refresh nor Tear message from the neighbouring node, the node sends a control plane connectivity disruption, CPCD, alarm message to the service ingress node of the respective service.

8. The method according to claim 7, wherein the ingress node of the service after having received the control plane connectivity disruption, CPCD, alarm message is adapted to notify a management plane and/or a service operator of the respective service that the service has become at least partially unmanageable due to a detected control plane connectivity disruption, CPCD, in the signal path and/or to trigger service restoration procedures.

9. The method according to claim 8, wherein if ResvModify, ResvTear or PartErr message reaches the neighbouring node of the non-responsive receiving node having caused the control plane connectivity disruption, CPCD, of the respective service, the neighbouring node sends the message directly to the IP address of the next node located after the non-responsive receiving node in the upstream direction, wherein this node forwards the message along the signal path of the service until it reaches the ingress node of the respective service to possibly release or reprovision network resources associated with the respective service.

10. The method according to claim 7, wherein if a temporarily failed non-responsive node having caused a control plane connectivity disruption, CPCD, of the service comes back into service and detects that it does not receive a Path/Resv Refresh message from at least one of its neighbouring nodes it sends at least one Path or Resv state verification message (Path/Resv Verify) to the at least one neighbouring node to check the existence of states associated with the respective service to which the at least one neighbouring node, depending whether the verified state exists or not, responds with a PathRefresh/ResvRefresh message to confirm the validity of the service, or a PathTear/ResvTear message to release network resources associated with the respective service.

11. The method according to claim 1, wherein the signalling message is sent by said sending node to the IP address of the next node located behind the non-responsive receiving node in an IP data packet along a route indicated in an IP routing table of the sending node.

12. The method according to claim 1, wherein the signalling messages are formed by RSVP-TE messages transported in a data communication network, IP DCN, serving the control plane.

* * * * *